United States Patent [19]

Chance

[11] Patent Number: 5,515,703
[45] Date of Patent: May 14, 1996

[54] MOTORCYCLE ANTI-THEFT FUEL LOCK

[76] Inventor: Clifford S. Chance, P.O. Box 86, Fullerton, Calif. 92632

[21] Appl. No.: 62,827

[22] Filed: May 14, 1993

[51] Int. Cl.⁶ .................................................. F16K 35/06
[52] U.S. Cl. .................. 70/176; 70/178; 70/233; 70/242; 70/432; 123/198 B; 137/384.2; 180/219
[58] Field of Search ............................. 70/175–180, 233, 70/242–244, 432; 137/384.2, 556; 123/198 B; 180/219

[56] References Cited

U.S. PATENT DOCUMENTS

| 1,217,406 | 2/1917 | Burkhardt | 70/242 |
| 2,006,027 | 6/1935 | Moore | 137/384.2 |
| 3,792,712 | 2/1974 | Fontana | 70/188 X |
| 4,554,946 | 11/1985 | Poole | 137/384.2 |
| 4,946,130 | 8/1990 | Kooiman | 70/176 X |
| 5,291,067 | 3/1994 | Nakajima et al. | 70/233 X |

FOREIGN PATENT DOCUMENTS

| 21322 | 2/1935 | Australia | 137/556 |
| 267237 | 3/1927 | United Kingdom | 70/242 |

Primary Examiner—Lloyd A. Gall

[57] ABSTRACT

A fuel line valve locking assembly for a motorcycle that is in fluid communication with a main tank inlet, a reserve tank inlet and an outlet and which selectively locks a fuel supply line valve closed, open to the main tank inlet, or open to the reserve tank inlet is disclosed.

4 Claims, 1 Drawing Sheet

MOTORCYCLE ANTI-THEFT FUEL LOCK

BACKGROUND TO THE INVENTION

This invention relates to motorcycles, relating specifically to fuel systems for motorcycles The long-standing problem with providing security to motorcycles continues. Efforts have been made to prevent the theft of motorcycles by locking the ignition, by locking various other components of the motorcycle, by chaining the motorcycle to a stationary object, etc.

Ignition locks are generally satisfactory where a motorcycle is parked in full view because it is difficult for a thief to "hot wire" the motorcycle in a short period of time. However, it is generally, fairly easy to hot wire a motorcycle and only a few minutes is required to complete the job and steal a motorcycle. It is far more difficult to re-plumb a motorcycle.

Gasoline line locks are known for use in automobiles. Various devices of this type are described, for example, in U.S. Pat. No. 4,217,925, Aug. 19, 1980, to Clark wherein it is contemplated that the lock be installed in the floor surface of the automobile; in U.S. Pat. No. 3,838,587, Oct. 1, 1974, to Good wherein the conventional ignition key was modified and a valve actuated by the ignition key in a fuel line; in U.S. Pat. No. 3,695,287, Oct. 3, 1972, to Rees, et. al., in which the valve mechanism was mounted on the bulkhead with the key access on one side of the bulkhead and the valve on the other side, and in U.S. Pat. No. 3,700,063, Oct. 24, 1972, to Dunseath, which discloses a very complex multiple plunger arrangement for actuating or permitting actuation of a valve. None of these systems is adaptable for use in motorcycles and, insofar as applicant is aware, motorcycle fuel line locks have not been used. In any event, the modification of a motorcycle fuel system to accommodate additional structures, such as additional valves and locks, is usually not possible, or at least not feasible in any practical sense. The space available for modifying the fuel system is extremely limited and there is very little structure to which any new structure can be mounted.

It is an object of the present invention to provide a motorcycle fuel line valve locking assembly which can be quickly mounted to an existing valving arrangement, thereby converting the valve into a fuel lock. This obviates the need for additional space, additional mounting structure, and the re-plumbing of the entire fuel system.

SUMMARY OF THE INVENTION

A fuel line valve locking assembly for a motorcycle is disclosed. The valve locking assembly is constructed and configured to be received in and secured to a valve body that has formed therein a valving chamber and, in fluid communication with said chamber, a main tank inlet, a reserve tank inlet and an outlet, and wherein said valve body rotatably receiving a valving assembly comprising an actuator member having a proximal end and a distal end, actuator means in the distal end thereof, means forming a liquid tight seal between the valve body and the actuator member, a valving element received in the valve body, the valving element being disposed in the valve body to be moved by the actuator member into an off position wherein fluid flow from both tanks is prevented, into an on position wherein fluid can flow from the main tank inlet to the outlet, and into a reserve position wherein fluid can flow from the reserve inlet to the outlet.

The valve locking assembly comprises a lock body configured externally to define a proximal end and a distal end, said lock body defining a passage therethrough. A locking element is received in the passage through the lock body. A key comprising a generally circular lock operating portion is provided. The distal ends of the lock body and the locking element define a generally circular receptacle for the lock operating portion of the key. The locking element also comprises an actuator engaging means on the proximal end thereof.

A mounting disk having an opening for snugly receiving the lock body is provided. Indicia are provided on one surface of the disk marking at least one OFF position, an ON position, and a RESERVE position, of the key in the locking assembly. Means are provided for mounting the lock body to the mounting disk. Means are also provided for securing the mounting disk to the lock body, securing the valving element in the valve body, positioning the actuator member into operative contact with the valving member and securing the sealing means into liquid sealing engagement, and the lock body member onto the valve body.

The valve locking assembly is constructed and configured to lock the valve closed in the OFF position of the key, to open the valve to the main tank inlet in the ON position of the key, and to open the valve to the reserve tank inlet in the RESERVE position of the key, as marked by the respective indicia on the mounting plate.

DESCRIPTION OF THE PREFERRED EMBODIMENTS

Figure 1:
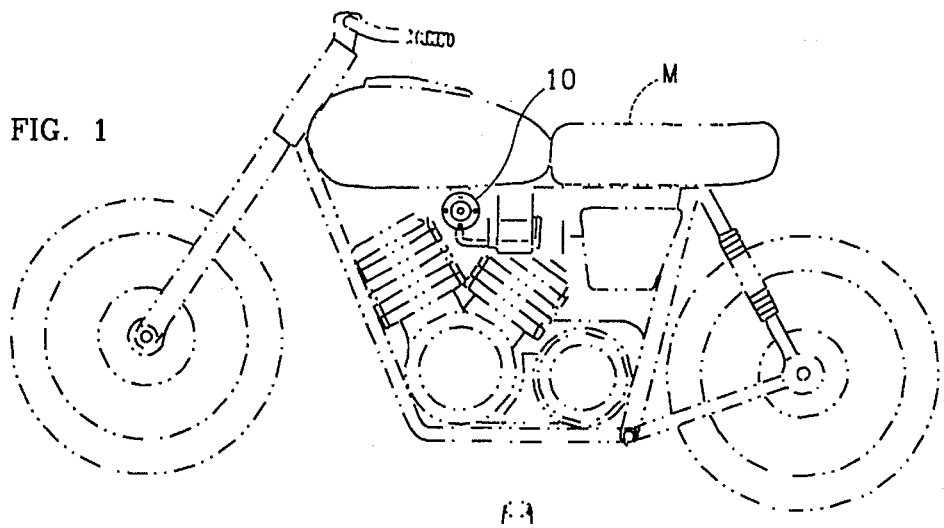
FIG. 1 depicts, in phantom line, a motorcycle and, in full line, the valve locking mechanism of the present invention mounted on the motorcycle.

Referring first to FIG. 1, the present invention, the valve locking assembly 10, is depicted secured to a valve on a motorcycle M.

Figure 2:
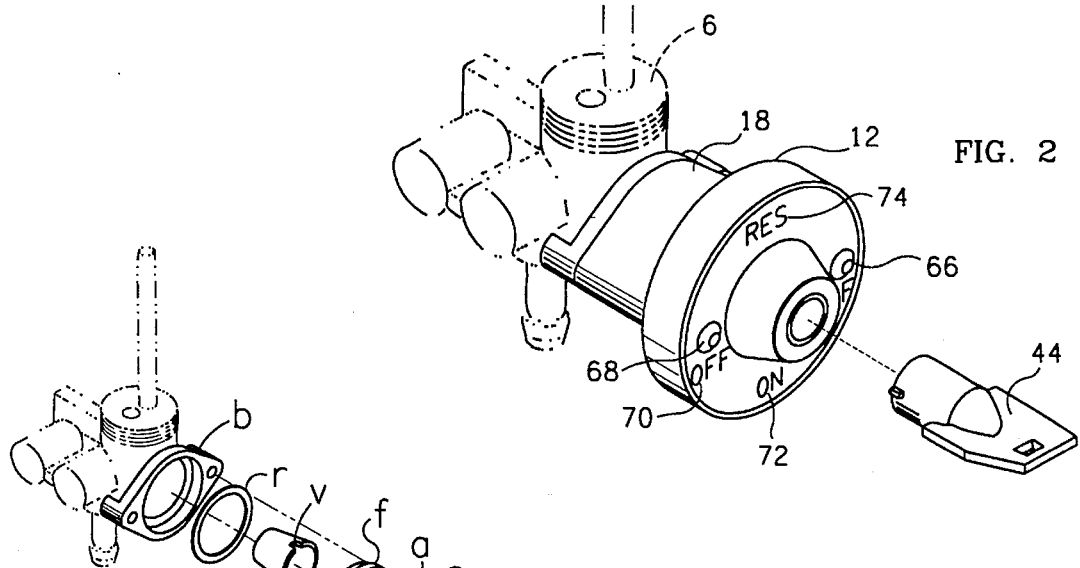
FIG. 2 is a perspective view of the valve locking mechanism secured to a motorcycle valve.

The overall arrangement of the valve locking assembly 10 mounted on a valve body b is best depicted in FIG. 2.

Figure 3:
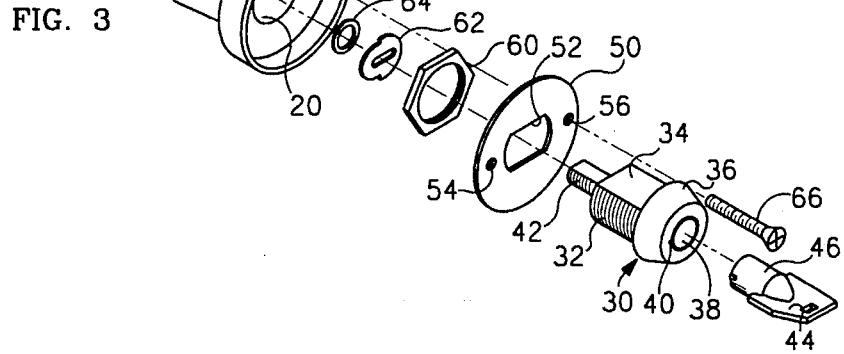
FIG. 3 is an exploded view of the valve and of the valve locking mechanism of the present invention.

The exploded view of FIG. 3, to which reference is now made provides the most detailed view of the invention.

The motorcycle fuel line valve locking assembly depicted in FIG. 1 through 3, specific reference being made to FIG. 3, is constructed and configured to be received in and secured to a valve body b that is secured in the fuel system of a motorcycle M as part of the original equipment on some motorcycles. The body has formed therein a valving chamber and, in fluid communication with said chamber, a main tank inlet, an auxiliary tank inlet and an outlet. A valving assembly is provided. The valving assembly comprises an actuator member a having a proximal end and a distal end, having formed in the distal end thereof an actuator slot s. A valving element v is rotatably received in the valve body. A fluid sealing ring r and a sealing flange f on the actuator member proximate the proximal end thereof provide a liquid seal, the flange compressing the sealing ring in the valve body forming a liquid tight seal between the valve body and the actuator member. The valving element is constructed, configured and disposed in the valve body to be rotated by the actuator member into an off position wherein fluid flow from both tanks is prevented, into an on position wherein fluid can flow only from the main tank inlet to the outlet, and into a reserve position wherein fluid can flow only from auxiliary inlet to the outlet.

The valve locking assembly 10 comprises a lock body member 12 having formed thereon a distal cylindrical body portion 14. The distal portion defines a generally cylindrical recess 16 therein. The lock body member also defines a proximal body portion 18. The lock body has formed therethrough and intersecting the cylindrical recess 16 a generally cylindrical passage 20.

A lock assembly comprises a lock body 30 configured externally to define an elongate pair of opposed generally cylindrical threaded portions 32 and a pair of opposed flat, unthreaded portions 34. These portions define the proximal end of the lock body. A frusto-conical portion 36 defines the distal end of the lock body. The lock body defines a generally cylindrical passage longitudinally through the center of the lock body. A locking element 38 is rotatably received in the passage through the lock body. The distal ends of the lock body 36 and the locking element 38 define a space between said ends in the form of a generally circular receptacle 40. Means 42 are provided for engaging and operating the valve actuator a.

A key 44, having a generally circular operating element 46 is included in the assembly. The generally circular receptacle 40 is so configured and constructed as to receive said generally circular operating element 46. Such keys are well-known. Some such keys have a lug protruding outwardly of the circular portion, some have a lug protruding inwardly of such portion, and others simply have a plurality of lugs extending in the circular configuration greater or lesser distances.

A mounting disk 50 having formed therein a generally central opening 52 having a pair of opposed flat sides and a pair of opposed arcuate sides is provided. The opening is constructed and configured to snugly receive the proximal portion of the lock body. The disk also forms a pair of mounting bolt apertures 54,56.

A threaded nut 60 received on the threaded portion of the lock body mounts the lock body to the mounting disk 50 through the central opening 52 thereof.

A rotary movement limiting washer 62 having formed therethrough a generally central aperture corresponding generally in size and shape to the actuator slot s is received on the actuator engaging means 42 and serves to prevent the key and locking element from rotating 360°. A spacer washer 64 is also received on the actuator engaging means 42.

A pair of mounting screws 66,68 secure the mounting disk 50 in the recess 16, secure the valving element v in the valve body b, position the actuator member a into operative contact with the element member and the sealing flange f into sealing compressional engagement with the sealing ring r and mount the lock body member 12 onto the valve body b.

Indicia are proved on one surface of the marking disk. One set of indicia 70 mark an OFF position. Another set of indicia 72 mark an ON position. Yet another set of indicia 74 mark a "RES" (RESERVE) position. The indicia are so disposed, and the locking assembly is so constructed and configured as to lock the valve closed in the OFF position of the key, to open the valve to the main tank inlet in the ON position of the key, and to open the valve to the reserve tank inlet in the RESERVE position of the key, as marked by the respective indicia on the mounting plate.

Industrial Application

The present invention is useful in the manufacture of motorcycles and in the retrofitting of motorcycles.

What is claimed is:

1. A fuel line valve locking assembly for a motorcycle that comprises a main tank and a reserve tank, said assembly comprising, in combination:

a valve body that has formed therein a valving chamber, said valve body forming in fluid communication with said valving chamber,
a main tank inlet,
a reserve tank inlet, and
an outlet;

a valving assembly rotatably received in said valving chamber, said valving assembly comprising
an actuator member having a proximal end and a distal end,
actuator means in the distal end thereof,
means forming a liquid tight seal between the valve body and the actuator member, a valving element received in the valve body, the valving element being disposed in the valve body to be moved by the actuator member into
   (a) an OFF position wherein fluid flow from the main tank and from the reserve tank to the outlet is prevented, into
   (b) an ON position wherein fluid can flow from the main tank inlet to the outlet, and
   (c) a RESERVE position wherein fluid can flow from the reserve tank inlet to the outlet, a valve locking assembly comprising a lock body member configured externally to define
a proximal end and
a distal end,
said lock body member defining an opening for receiving a locking mechanism therein,
a locking mechanism received in the lock body member,
a key comprising a lock operating portion;

means securing the valving element in the valve body, positioning the actuator member into operative contact with the valving element and the lock body member onto the valve body, said locking assembly being constructed and configured selectively to lock the valving assembly closed to prevent flow from the main tank inlet and to open the valving assembly to permit flow from the main tank inlet.

2. A fuel line valve locking assembly for a motorcycle constructed and configured to be received in and secured to a valve body that has formed therein a valving chamber and, in fluid communication with said chamber, a main tank inlet, a reserve tank inlet and an outlet, said valve body rotatably receiving a valving assembly comprising an actuator member having a proximal end and a distal end, actuator means in the distal end thereof, means forming a liquid tight seal between the valve body and the actuator member, a valving element received in the valve body, the valving element being disposed in the valve body to be moved by the actuator member into an off position wherein fluid flow from both tanks is prevented, into an on position wherein fluid can flow from the main tank inlet to the outlet, and into a reserve tank position wherein fluid can flow from the reserve tank inlet to the outlet, the valve locking assembly comprising:

a lock body member configured externally to define a proximal end and a distal end, said lock body member defining a passage therethrough, a locking body and locking element received in the passage through the lock body member, a key comprising a generally circular lock operating portion, the distal ends of the lock body and the locking element defining a generally circular receptacle for the lock operating portion of the key, and actuator engaging means on a proximal end of the locking element; a mounting disk having an opening for snugly receiving the lock body;

means mounting the lock body member to the mounting disk;

means securing the mounting disk to the lock body member, securing the valving element in the valve body, positioning the actuator member into operative contact with the valving element and securing the means forming a liquid tight seal into liquid sealing engagement between the valve body and the actuator member, and securing the lock body member onto the valve body;

the locking assembly being constructed and configured selectively to lock the valving assembly closed, to open the valving assembly to the main tank inlet, and to open the valving assembly to the reserve tank inlet.

3. A fuel line valve locking assembly for a motorcycle constructed and configured to be received in and secured to a valve body that has formed therein a valving chamber and, in fluid communication with said chamber, a main tank inlet, a reserve tank inlet and an outlet, the valve body rotatably receiving a valving member, an actuator member having a proximal end and a distal end and actuator means in the distal end thereof, and means forming a liquid tight seal between the valve body and the actuator member, the valving member being constructed, configured and disposed in the valve body to be rotated by the actuator member into an off position wherein fluid flow from both tanks is prevented, into an on position wherein fluid can flow from the main tank inlet to the outlet, and into a reserve position wherein fluid can flow from the reserve tank inlet to the outlet, the valve locking assembly comprising:

a lock body member having a distal body portion having formed therein a cylindrical recess and a proximal body portion, said lock body member having formed therethrough a generally cylindrical passage;

a lock body configured externally to form means to define a proximal end of the lock body, and a portion defining a distal end of the lock body, said lock body defining a passage through the lock body, a locking element received in the passage through the lock body, a key comprising a generally circular lock engaging and operating portion, a distal end of the locking element defining a generally circular receptacle for the lock engaging and operating portion of the key, said locking element also forming on a proximal end thereof actuator engaging means;

a mounting disk having formed therein an opening configured to snugly receive the proximal and of the lock body, said disk also forming means for mounting the disk;

a threaded nut received on a threaded portion of the lock body mounting the lock body to the mounting disk through the opening thereof;

means for limiting the rotation of the locking element;

means for spacing the locking element from the actuator member; and means securing the mounting disk to the lock body member, securing the valving member in the valve body, positioning the actuator member into operative contact with the valving member and securing the sealing means into liquid sealing engagement, and the lock body member onto the valve body;

the valve locking assembly being constructed and configured to lock the valving member closed, to open the valving member to the main tank inlet, and to open the valving member to the reserve tank inlet.

4. A motorcycle fuel line valve locking assembly constructed and configured to be received in and secured to a valve body (b) secured in the fuel system of a motorcycle (M), said body having formed therein a valving chamber and, in fluid communication with said chamber, a main tank inlet, a reserve tank inlet and an outlet, and a valving assembly comprising an actuator member (a) having a proximal end and a distal end, having formed in the distal end thereof an actuator slot (s), a valving element (v) rotatably received in the valve body, a fluid sealing ring (r) and a sealing flange (f) on the actuator member proximate the proximal end thereof, the sealing flange compressing the sealing ring in the valve body forming a liquid tight seal between the valve body and the actuator member, the valving element being constructed, configured and disposed in the valve body to be rotated by the actuator member into an off position wherein fluid flow from both tanks is prevented, into an on position wherein fluid can flow only from the main tank inlet to the outlet, and into a reserve position wherein fluid can flow only from the reserve tank inlet to the outlet, the valve locking assembly (10) comprising:

a lock body member (12) having formed thereon a distal cylindrical body portion (14 ) having a generally cylindrical recess (16) therein and a proximal body portion (18) having formed therethrough and intersecting the cylindrical recess (16) a generally cylindrical passage (20);

a lock assembly comprising a lock body (30) configured externally to define an elongate pair of opposed generally cylindrical threaded portions (32) and a pair of opposed flat, unthreaded portions (34), said portions defining a proximal end of the lock body, and a frusto-conical portion (36) defining a distal end of the lock body, said lock body defining a generally cylindrical passage longitudinally through the center of the lock body, a locking element (38) rotatably received in the passage through the lock body, the distal ends of the lock body (36) and the locking element (38) defining a generally circular receptacle (40), and means (42) for engaging and operating the actuator member (a);

a key (44) having a generally circular operating element (46), the generally circular receptacle (40) being so configured and constructed as to receive said generally circular operating element (46);

a mounting disk (50) having formed therein a generally central opening (52) having a pair of opposed flat sides and a pair of opposed arcuate sides, the opening being constructed and configured to snugly receive the proximal end of the lock body, said disk also forming a pair of mounting bolt apertures (54,56);

a threaded nut (60) received on the threaded portion of the lock body mounting the lock body to the mounting disk (50) through the central opening (52) thereof;

a rotary movement limiting washer (62) having formed therethrough a generally central aperture corresponding generally in size and shape to the actuator slot (s), said washer (62) being received on the actuator engaging means (42);

a spacer washer (64) received on the actuator engaging means (42);

a pair of mounting screws (66, 68) securing the mounting disk (50) in the recess (16), the valving element (v) in the valve body (b), the actuator member (a) into operative contact with the valving element and the sealing flange (f) into sealing compressional engagement with the sealing ring (r), and the lock body member (12) onto the valve body (b); and indicia (70) on one surface of the disk marking an OFF position, indicia (72) on said one surface marking an ON position, and indicia (74) on said one surface marking a RESERVE position, the indicia being so disposed, and the locking assembly being constructed and configured to lock the valving assembly closed in the OFF position of the key, to open the valving assembly to the main tank inlet in the ON position of the key, and to open the valving assembly to the reserve tank inlet in the RESERVE position of the key, as marked by the respective indicia on the mounting disk.

\* \* \* \* \*